No. 648,902.  Patented May 1, 1900.
C. H. ELY & W. K. PORTER.
SEAT JOINT.
(Application filed Sept. 21, 1899.)

(No Model.)

WITNESSES
W. E. Allen
Alfred Knight

INVENTORS
Charles H. Ely.
William K. Porter.
By Knight Bros.
Attorneys.

UNITED STATES PATENT OFFICE.

CHARLES H. ELY AND WILLIAM K. PORTER, OF MUSKEGON, MICHIGAN.

SEAT-JOINT.

SPECIFICATION forming part of Letters Patent No. 648,902, dated May 1, 1900.

Application filed September 21, 1899. Serial No. 731,181. (No model.)

*To all whom it may concern:*

Be it known that we, CHARLES H. ELY and WILLIAM K. PORTER, citizens of the United States, residing at Muskegon, in the county of Muskegon and State of Michigan, have invented certain new and useful Improvements in Seat-Joints, of which the following is a specification.

Our invention relates to the joints employed for attaching the hinging members of folding seats to their supporting-frames—such, for instance, as commonly used in school-seats; and our invention consists in certain novel features of construction to be hereinafter fully described, and particularly pointed out in the claims, whereby a hinging-joint is provided of superior construction as to durability and noiselessness.

Figure 1:
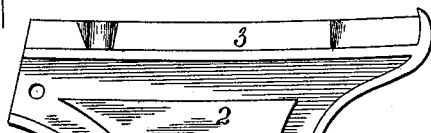
Figure 2:
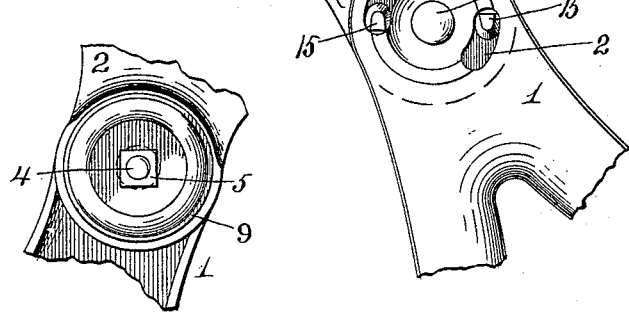
Figure 3:
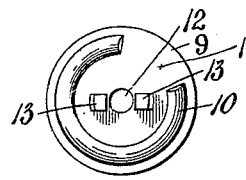
Figure 4:
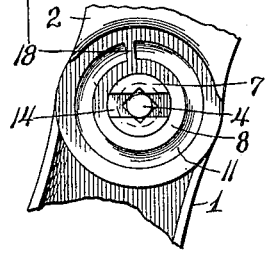
Figure 5:
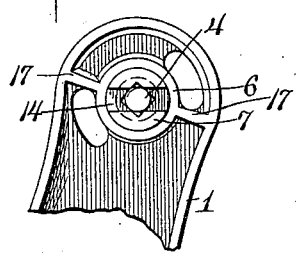
Figure 6:
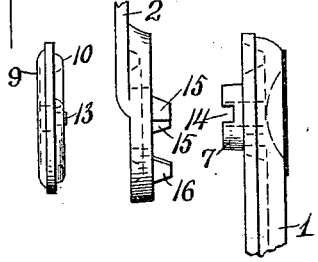
Figure 7:
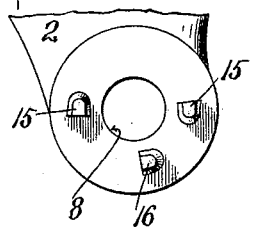
Figure 8:
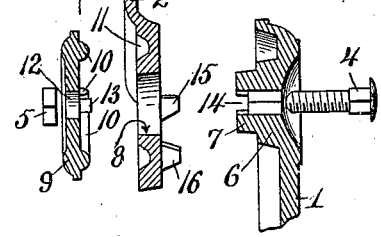

In the accompanying drawings, Figure 1 represents a side elevation of a supporting-frame, together with the hinging member attached thereto through the medium of our improved hinge-joint. Fig. 2 is an elevation of the side of the joint opposite to that shown in Fig. 1. Fig. 3 is an inner face view of the centering, clamping, and limiting washer. Fig. 4 is an inner face view of that portion of the joint to which the washer shown in Fig. 3 is applied. Fig. 5 is an inner face view of the fixed member of the joint—to wit, the part carried by the supporting-frame. Fig. 6 is an edge view of the segregated parts of the joint. Fig. 7 is an inner face view of the part of the joint carried by the hinging member. Fig. 8 is an axial sectional view of the segregated parts of the joint, together with the securing-bolt.

1 represents a portion of the supporting-frame, and 2 the hinging member, of a folding seat, 3 being the tenon by means of which the seat proper or wooden portion is secured to the member 2. 4 represents the securing-bolt, which carries a nut 5.

The fixed member 1 is formed with a boss 6, having a reduced projection 7, upon which latter the hinging member 2 is mounted to turn by means of its bearing 8.

9 represents a centering, clamping, and limiting washer, which is provided with an annular rib 10, which fits into a correspondingly-formed groove 11 in the hinging member 2 and is centrally perforated at 12 to receive the securing-bolt 4, the nut 5 of which latter impinges said washer.

13 represents diametrically-located lugs or feathers upon the inner face of the washer 9, which lugs or feathers enter a diametric slot 14 in the extension 7 on the boss 6. By this means the washer 9 is secured against turning relatively upon the member 1, and the axial dimension of the projection 7 is such that the washer 9 is clamped against the member 1 by means of the securing-bolt 4. Binding pressure upon the hinging member 2 is thereby prevented, and said hinging member is allowed freedom of action while being centered with sufficient accuracy by the extension 7 and annular rib 10.

In order to limit the swinging motion of the member 2 upon the member 1, the former is provided with lugs 15 and 16, concentrically arranged about the bearing 8 at a radial distance, which causes them to move about the boss 6, while said boss 6 on the member 1 is provided with the diametrically-opposed radial stops 17, with which said lugs 15 and 16 engage. The parts are so located that when the seat is in position for use the lugs 15 engage, respectively, above and below the stops 17, while when the seat is raised the lug 16 engages beneath one of said stops 17. The distance between the opposed square faces of the lugs 15 and 16 represents the arc through which the seat moves from the position of its use, as shown in Fig. 1, to its folded position, toward which it moves in the direction of the arrow shown in Fig. 1. The swinging member is further limited in its movement by the radial web 18 in the annular groove 11, Fig. 4, which plays in the opening 19 in the annular rib 10. (Shown in Fig. 3.) By means of the stops described the hinging member of the seat is suppported rigidly in its position of use on opposite sides of the rotating portion of the joint by parts rigidly fixed to the support.

Having thus described our invention, the following is what we claim as new therein, and desire to secure by Letters Patent:

1. The herein-described hinge-joint for seats comprising the member 1 having the projection 7, the swinging member 2 having the bearing 8 fitting the projection 7 and through which bearing said projection 7 extends, the clamping and centering washer 9, said washer 9 and member 2 being provided, the one with a groove and the other with a coöperating rib, providing between them a rib-and-groove connection concentric with the bearing in said member 2, said washer abutting the end of the projection 7, and the securing-bolt 4; substantially as and for the purposes set forth.

2. The herein-described hinge-joint for seats, comprising the member 1 having the boss 6 formed with an extension 7 and with the stops 17 integral with said boss; the hinging member 2 provided with a bearing 8 receiving the projection 7 and with lugs 15 overlapping the boss 6 and engaging the opposite sides of the stops 17; the washer 9 fitted to the face of the member 2 opposite to the lugs 15 and abutting the protruding end of the extension 7; a rib and groove formed upon the respective opposed faces of member 2 and washer 9 concentric with the bearing 8; and the securing-bolt 4; substantially as and for the purposes set forth.

3. In combination with the fixed member 1 having the extension, and the hinging member 2 having a bearing fitting said extension and provided with a concentric groove and a radial web in said groove; the clamping, centering and limiting washer formed with an annular rib fitting the annular groove of the member 2, and with an opening therein in which the web in said groove works, and with a feather-and-groove connection with the extension on the fixed member whereby the washer is prevented from turning, while permitting a limited swinging movement of the movable member; and the securing-bolt; all substantially as herein set forth.

CHARLES H. ELY.
    WILLIAM K. PORTER.

Witnesses:
 JOHN Q. ROSS,
 MABEL R. RODGERS.